United States Patent [19]

Ooi et al.

[11] Patent Number: 5,313,662
[45] Date of Patent: May 17, 1994

[54] SPLIT-RING RESONATOR BANDPASS FILTER WITH ADJUSTABLE ZERO

[75] Inventors: Leng H. Ooi; Peter J. Yeh, both of Sunrise; Branko Avanic, Coral Cables, all of Fla.

[73] Assignee: Motorola, Inc., Schaumburg, Ill.

[21] Appl. No.: 861,360

[22] Filed: Mar. 30, 1992

Related U.S. Application Data

[63] Continuation of Ser. No. 558,283, Jul. 26, 1990, abandoned.

[51] Int. Cl.[5] .............................................. H04B 1/16
[52] U.S. Cl. ..................... 455/339; 455/327; 333/204
[58] Field of Search ................ 455/323, 327, 339, 41, 455/306, 307; 333/204, 205, 219.1, 219, 246

[56] References Cited

U.S. PATENT DOCUMENTS

| | | | |
|---|---|---|---|
| 4,470,096 | 9/1984 | Guertin | 361/277 |
| 4,513,263 | 4/1985 | Minnis | 333/204 |
| 4,763,340 | 8/1988 | Yoneda et al. | 455/41 |
| 4,876,744 | 10/1989 | Endo et al. | 455/327 |
| 4,949,398 | 8/1990 | Maas | 455/327 |
| 5,124,675 | 6/1992 | Komazaki et al. | 333/204 |

OTHER PUBLICATIONS

Mirdn, "A Hybrid UHF Narrow-Band Filter Design" IEEE Transactions on Circuits & Systems pp. 353-357 vol. 38, No. 2, Apr. 1, 1991.

Primary Examiner—Reinhard J. Eisenzopf
Assistant Examiner—Edward Urban
Attorney, Agent, or Firm—Michael J. Buchenhorner; Robert S. Babayi; M. Mansour Ghomeshi

[57] ABSTRACT

A bandpass filter, having an input port and an output port, comprises a first microstrip split-ring resonator coupled to input port, and a second microstrip split-ring resonator coupled to the first microstrip split-ring resonator, and coupled to the output port. A lumped or distributed capacitance is disposed between the first microstrip split-ring resonator and the second microstrip split-ring resonator.

5 Claims, 3 Drawing Sheets

SPLIT-RING RESONATOR BANDPASS FILTER WITH ADJUSTABLE ZERO

This is a continuation of application Ser. No. 07/558,283, filed 07/26/90, and now abandoned.

TECHNICAL FIELD

This invention relates generally to bandpass filters (BPFs) and more specifically to BPFs using split ring resonators.

BACKGROUND

Microstrip ring resonators are now used in bandpass filter applications to overcome the influence that parasitic components generated at short circuited points in resonators have on circuit losses and resonance frequencies. However, conventional microstrip ring resonator BPFs are commonly designed for control of the in-band response without regard for the location of the out-of-band zeroes. The selectivity of a ring BPF may be improved by an appropriate choice of the zeroes. Thus a need exists for a ring resonator wherein the location of the zeroes may be easily designed for.

SUMMARY OF THE INVENTION

Accordingly, it is an object of the present invention to overcome the detriments of the prior art.

Briefly, according to the invention, the transmission zeroes of a split ring resonator BPF can be moved closer to the resonant frequency by introducing lumped or distributed capacitance between two split-ring resonators. The shift in the transmission zeroes improves the selectivity of the ring BPF with negligible degradation of the in-band response.

DETAILED DESCRIPTION OF THE PREFERRED EMBODIMENT

Figure 1:
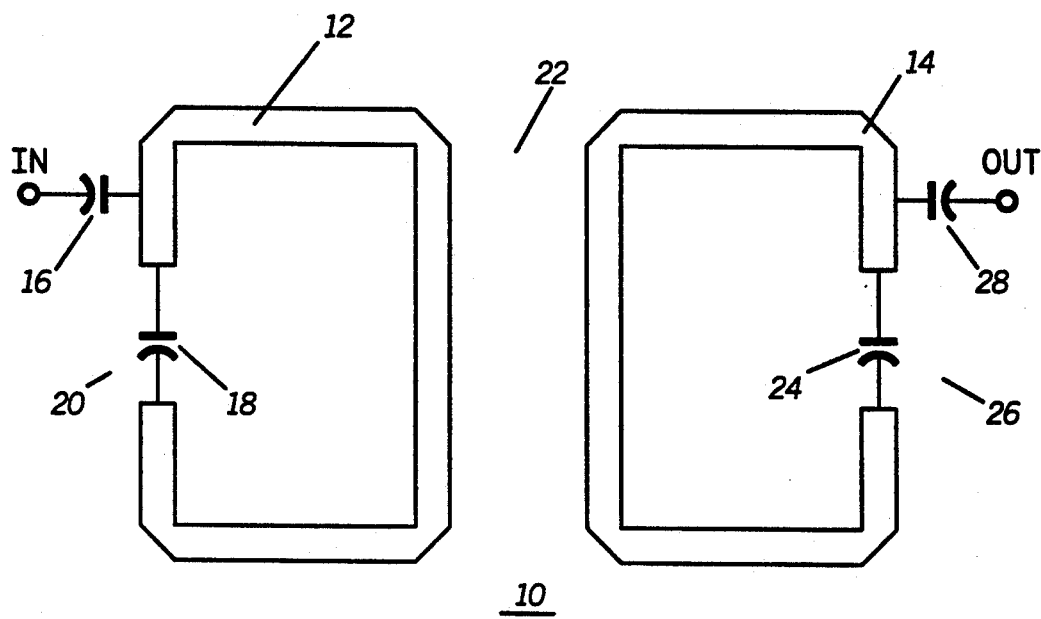
FIG. 1 is a conventional split-ring resonator BPF.

Referring to FIG. 1, a conventional two-pole split-ring microstrip resonator BPF 10 is shown. The BPF 10 includes a first microstrip ring 12 and a second microstrip ring 14. A signal is received at the input port through a capacitor 16. The capacitor 16 is provided for impedance matching purposes. The first ring 12 has a gap 20 in one of its sides. A capacitor 18 is connected across the gap 20 to reduce the physical dimensions of the ring 12 while maintaining the electrical dimension as required for achieving resonance at the desired frequency. The signal received at the first ring 12 is electromagnetically coupled to the second ring 14 across a gap (or resonator spacing) 22. The second ring 14 also has a gap 26 and a capacitor 24 serving the same purpose as the gap 20 and capacitor 18. The signal coupled out of the ring 14 may be tapped at the output through a capacitor 28, or directly through a transmission line.

Figure 2:
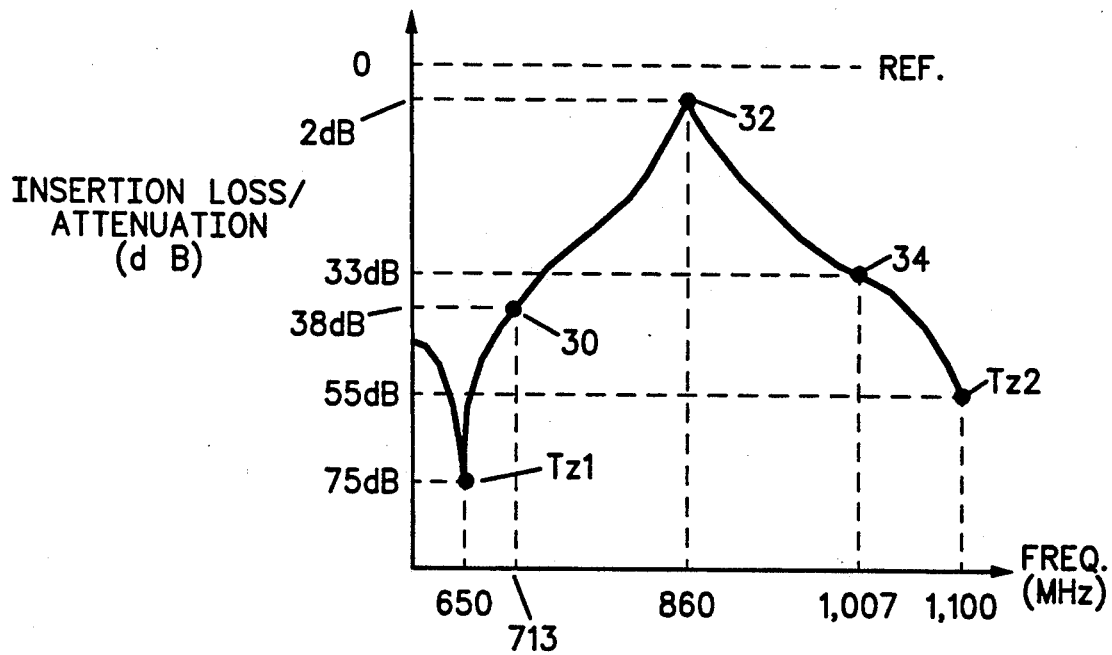
FIG. 2 shows a response curve for a conventional split-ring resonator BPF.

The response of BPF 10 is shown in FIG. 2 where transmission zeroes are located at $T_{z1}$ (650 MHz) and at $T_{z2}$ (>1100 MHz). Point 32, which represents the resonance frequency, is within the passband. Points 30, and 34 represent the out-band.

Figure 3:
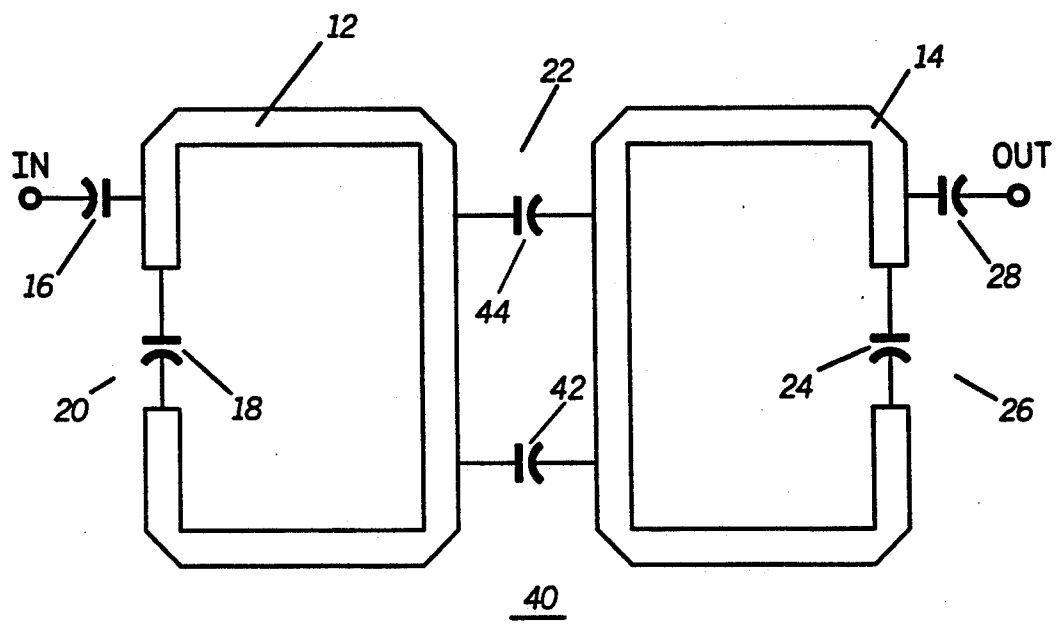
FIG. 3 is a split-ring resonator BPF in accordance with the invention.
Figure 4:
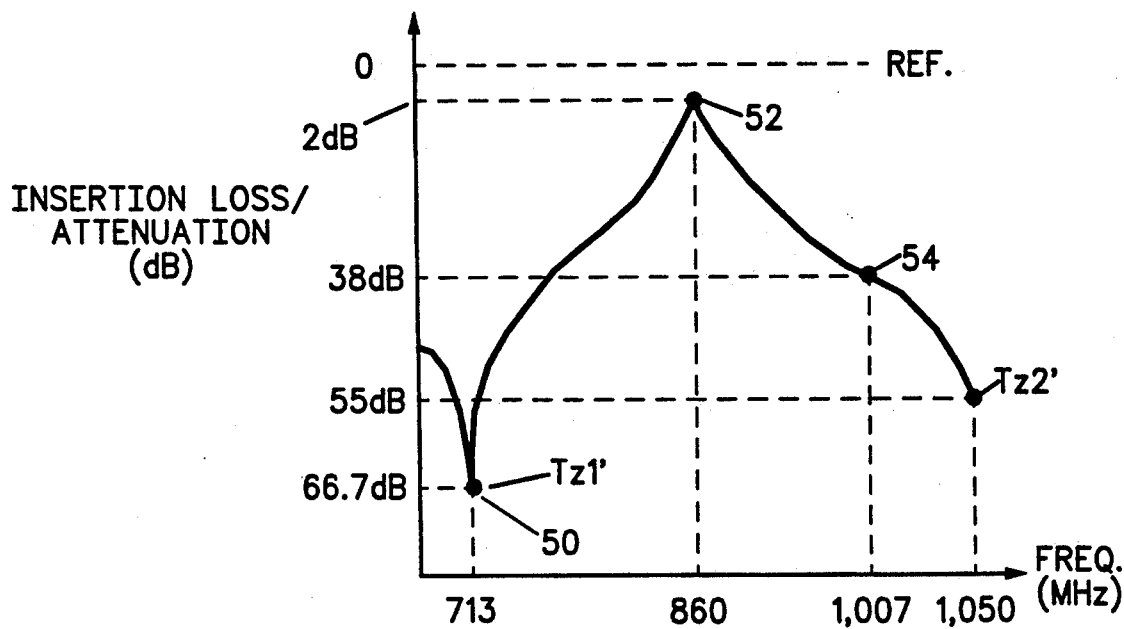
FIG. 4 shows a response curve for a split-ring resonator BPF in accordance with the invention.

Referring to FIG. 3, according to the invention, two lumped capacitors 42 and 44 are introduced across the gap 22 in the BPF 10, resulting in the BPF 40. This change results in the response shown in FIG. 4. The transmission zeroes, $T_{z1'}$ and $T_{z2'}$ move closer to the resonant frequency (at point 52). Thus the point $T_{z1'}$ is now located at 713 MHz (coinciding with test point 50), and the point $T_{z2'}$ is located at 1050 MHz. The test points 50, 52, and 54 correspond in frequency to the test points 30, 32, and 34, respectively. The change in the locations of the transmission zeroes improves the selectivity of the BPF with negligible degradation of the in-band response. Therefore, by introducing capacitors 42 and 44, the response of a BPF such as BPF 10 is improved to that of a BPF having more than two poles.

Figure 5:
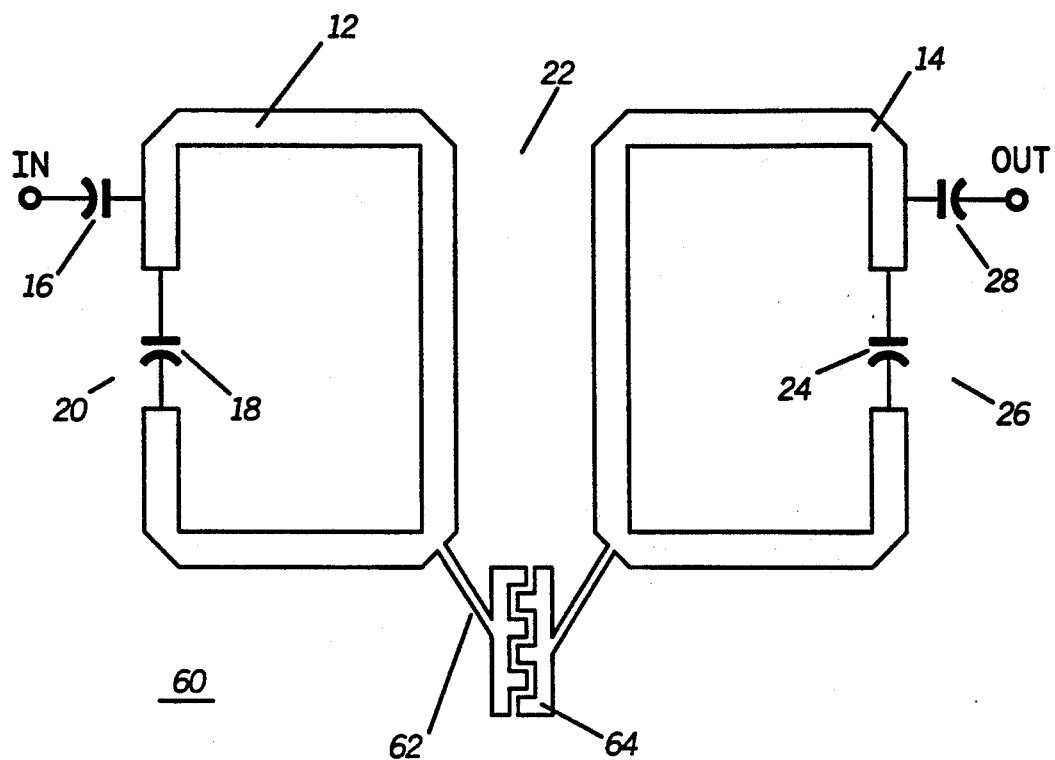
FIG. 5 is a another split-ring resonator BPF in accordance with the invention.

Referring to FIG. 5, a BPF 60 is shown which has a response similar to that of the BPF 40. The BPF 60 is the same as the BPF 10 except that a distributed capacitance 62 is provided across the gap 22. The results of introducing the capacitance 62 can result in the response of FIG. 3 with the appropriate choice of capacitance (e.g., 0.5 pF). The distributed capacitance 62 includes a plurality of laser-trimmable fingers 64 located on the substrate (e.g., a ceramic substrate) so that the desired capacitance may be achieved by trimming away an appropriate amount of metal from the fingers 64.

The width of the coupling gap 22 determines the coupling coefficient. It is advantageous to make the parts of the rings bordering on the gap 22 from a laser-trimmable material so that the designer can adjust the coupling coefficient of the BPF by simply trimming away the appropriate amounts of metal from the ring edges bordering on the coupling gap.

Figure 6:
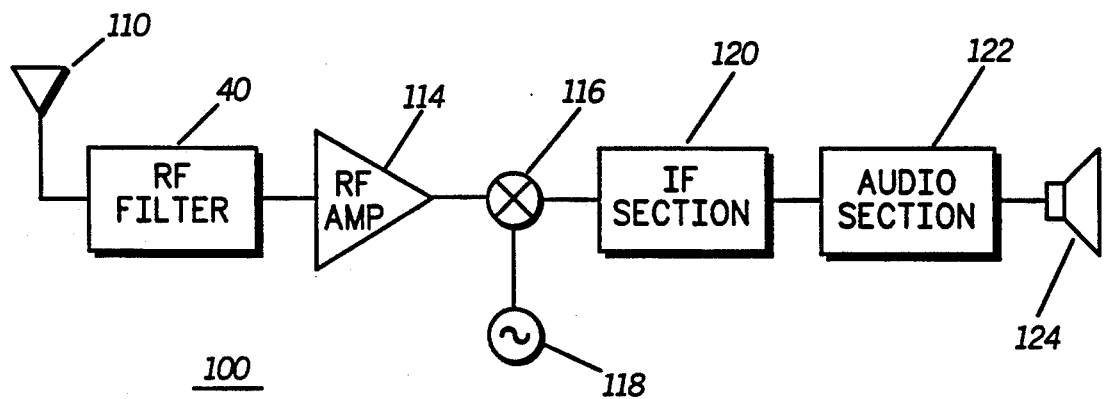
FIG. 6 shows a block diagram of a radio in accordance with the invention.

Referring to FIG. 6, a radio 100 is shown incorporating the RF filter 40 in accordance with the invention. A radio-frequency signal is received at a conventional antenna 110 and filtered by the BPF 40 before amplification by a conventional RF amplifier 114. The amplified signal provided by the RF amplifier 114 is then mixed with a reference signal provided by a conventional local oscillator 118 to produce an intermediate frequency (IF) signal. The IF signal is then applied to a conventional IF section 120 where it is processed and demodulated to produce an audio signal. The audio signal is then applied to a conventional audio section 122 and presented to a listener by a conventional speaker 124.

Employing the BPF 40 in such an application improves the performance of the radio 100. However, it will be appreciated that the invention may be advantageously used in other RF parts of radio receivers or transmitters.

What is claimed is:

1. A bandpass filter, having an input port and an output port, and having at least one transmission zero and a center frequency, the bandpass filter comprising:
    a first microstrip split-ring resonator coupled to the input port;
    a second microstrip split-ring resonator coupled to the first microstrip split-ring resonator, and coupled to the output port; and
    a lumped capacitor coupled between the first microstrip split-ring resonator and the second microstrip split-ring resonator for moving the transmission zero closer to the center frequency while maintaining the center frequency.

2. The bandpass filter of claim 1, wherein the lumped capacitor comprises a discrete capacitor.

3. The bandpass filter of claim 1, wherein the lumped capacitor comprises two discrete capacitors.

4. The bandpass filter of claim 1, wherein the first microstrip split-ring resonator includes a laser-trimmable portion adjacent to the second microstrip split-ring resonator.

5. A communication device comprising:
   receiver means for receiving a modulated signal;
   detector means for demodulating the modulated signal, to produce a demodulated signal;
   presenting means for presenting the demodulated signal to a user of the communication device; and
   the receiver means comprising a bandpass filter, having an input port and an output port, and having at least one transmission zero and a center frequency, the bandpass filter comprising:
   a first microstrip split-ring resonator located on a substrate and coupled to the input port;
   a second microstrip split-ring resonator located on the substrate coupled to the first microstrip split-ring resonator, and coupled to the output port; and
   a capacitor coupled between the first microstrip split-ring resonator and the second microstrip split-ring resonator for moving the transmission zero closer to the center frequency while maintaining the center frequency.

* * * * *